United States Patent [19]

Mueller et al.

[11] Patent Number: 4,506,049
[45] Date of Patent: Mar. 19, 1985

[54] THERMOPLASTIC PVC MOLDING COMPOSITIONS CONTAINING A PHOSPHITE COMPOUND

[75] Inventors: Warren B. Mueller; Jesse D. Jones, both of Baton Rouge, La.

[73] Assignee: Ethyl Corporation, Richmond, Va.

[21] Appl. No.: 494,917

[22] Filed: May 16, 1983

[51] Int. Cl.³ .................. C08K 5/04; C08L 25/08; C08L 27/06; C08L 51/04
[52] U.S. Cl. .................. 524/139; 524/178; 524/179; 524/180; 524/504; 525/71; 525/74; 525/207
[58] Field of Search .................. 525/71, 74, 207; 524/128, 139

[56] References Cited

U.S. PATENT DOCUMENTS

| | | | |
|---|---|---|---|
| 3,533,975 | 10/1970 | Scullin | 524/128 |
| 3,632,839 | 1/1972 | Young et al. | 525/192 |
| 3,666,700 | 5/1972 | King et al. | 524/128 |
| 3,919,354 | 11/1975 | Moore et al. | 260/880 R |
| 3,928,267 | 12/1975 | Rhodes et al. | 524/128 |
| 4,311,806 | 1/1982 | Dufour | 525/71 |
| 4,329,272 | 5/1982 | Dufour | 524/288 |

Primary Examiner—Carman J. Seccuro
Attorney, Agent, or Firm—Donald L. Johnson; John F. Sieberth; E. Donald Mays

[57] ABSTRACT

A thermoplastic molding composition having good gloss and physical properties is disclosed. This composition contains in intimate admixture: a vinyl chloride polymer; a copolymer of a vinyl aromatic compound and an $\alpha,\beta$-unsaturated cyclic anhydride; a styrene-maleic anhydride copolymer having a number average molecular weight within the range of from about 1000 to about 8000; and an alkyl diphenyl phosphite. The copolymer of a vinyl aromatic compound and an $\alpha,\beta$-unsaturated cyclic anhydride can be rubber modified.

48 Claims, No Drawings

THERMOPLASTIC PVC MOLDING COMPOSITIONS CONTAINING A PHOSPHITE COMPOUND

This invention relates to injection moldable blends of polyvinyl chloride and copolymers of the styrene-maleic anhydride type which yield articles having good gloss.

BACKGROUND

As reported in co-pending U.S. patent application, Ser. No. 209,843, filed by Jesse D. Jones and Edwin D. Hornbaker on Nov. 24, 1980, it has been discovered that injection moldable blends of vinyl chloride polymers and copolymers of the styrene-maleic anhydride type can be formulated to have good performance characteristics.

While such blends have many uses, articles injection molded therefrom tend to have low surface gloss. In commercial applications, where surface gloss is important for consumer acceptance, these blends are not the materials of first choice.

Therefore, there is a need for improved injection moldable blends of polyvinyl chloride and copolymers of the styrene maleic anhydride type which yield articles having both good gloss and performance characteristics.

THE INVENTION

It has now been discovered that blends of polyvinyl chloride and copolymers of the styrene maleic anhydride type can be formulated to have good gloss as measured by ASTM 523-80. These improved compositions are easily produced by known blending procedures and are readily suitable for use in commercially available injection molding machines.

The thermoplastic injection moldable blends of this invention comprise (a) a vinyl chloride polymer having a relative viscosity, as measured at a concentration of 1 gram per 100 grams of cyclohexanone at 25° C., falling within the range of from about 1.50 to about 1.85; (b) a thermoplastic copolymer having a number average molecular weight of at least thirty thousand and derived from a vinyl aromatic compound and an $\alpha,\beta$-unsaturated cyclic anhydride in which the relative proportions, in the copolymer, of the polymerized vinyl aromatic compound and the polymerized anhydride fall within the range of from about 90 to about 70 weight percent of the vinyl aromatic compound and from about 10 to about 30 weight percent of the anhydride; (c) a styrene-maleic anhydride copolymer having a number average molecular weight within the range of from about 1000 to about 8000; (d) an alkyl diphenyl phosphite in which the alkyl group has from about 6 to about 18 carbon atoms. Measured as parts by weight per hundred parts by weight of components (a) and (b), preferably, component (a) is present in an amount within the range of from about 80 to about 20 parts, component (b) is present in an amount within the range of from about 20 to 80 parts, component (c) is present in an amount within the range of from about 0.5 to about 3 parts, and component (d) is present in an amount within the range of from about 0.5 to about 3 parts.

By utilizing components (c) and (d) in combination, gloss values for articles injection molded from the blends of this invention are greater than the gloss values realized when utilizing components (c) and (d) alone.

The use of component (c) to enhance gloss is known, however, the use of component (d) has not been considered for gloss enhancement. In fact, component (d), when used alone, results in articles from blends of polyvinyl chloride and copolymers of the styrene-maleic anhydride type having poor gloss. It is surprising therefore that component (d) would contribute to gloss enhancement.

In a preferred embodiment of this invention, the blend is made from a rubber-modified thermoplastic copolymer of a vinyl aromatic compound and an $\alpha,\beta$-unsaturated cyclic anhydride in which the copolymer has a number average molecular weight of at least thirty thousand. Here again, the relative proportions of the vinyl aromatic compound and the $\alpha,\beta$-unsaturated cyclic anhydride in the resin phase of the copolymer fall within the range of from about 90 to about 70 weight percent of the vinyl aromatic compound and from about 10 to about 30 weight percent of the cyclic anhydride, but in this case the graft copolymer contains up to about 33 parts (preferably 25 parts or less) by weight of the rubber per 100 parts by weight of the copolymer itself.

Hence, this invention also provides thermoplastic injection moldable blends which comprise: (a) a vinyl chloride polymer having a relative viscosity, as measured at a concentration of 1 gram per 100 grams of cyclohexanone at 25° C., falling within the range of from about 1.50 to about 1.85; (b) a rubber-modified thermoplastic copolymer of a vinyl aromatic compound and an $\alpha,\beta$-unsaturated cyclic anhydride in which the copolymer has a number average molecular weight of at least thirty thousand, the relative proportions, in the copolymer, of the vinyl aromatic compound and the anhydride falling within the range of from about 90 to about 70 weight percent of the vinyl aromatic compound and from about 10 to about 30 weight percent of the anhydride, and in which the graft copolymer contains up to 33 (preferably up to about 25) parts by weight of the rubber per 100 parts by weight of the copolymer; (c) a styrene-maleic anhydride copolymer having a number average molecular weight within the range of from about 1000 to about 8000; (d) an alkyl diphenyl phosphite in which the alkyl group has from about 6 to about 18 carbon atoms. Quantitatively, the relative amounts of components (a), (b), (c) and (d) for this just described blend are the same as for the first-described blend of this invention.

Component (a), the vinyl chloride resin, may be a homopolymer of vinyl chloride or a copolymer of vinyl chloride with a minor portion of one or more monomers copolymerizable with vinyl chloride. In such copolymers, vinyl chloride comprises, on a weight basis, at least about 90 percent of the copolymer and the copolymerizable monomer comprises up to about 10 percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether and vinyl cetyl ether; acrylic acid and methacrylic acid; acrylonitrile and methacrylonitrile; diethyl fumarate; maleic anhydride; dimethyl itaconate; N-vinyl carbazole; or mixtures thereof. Further, the vinyl chloride resins may include halogenated polyvinyl chloride and the like.

Methods for the preparation of vinyl chloride polymers are well known in the art and reported in the literature. See for example, Kirk-Othmer, *Encyclopedia of Chemical Technology,* Second Edition, Interscience Publishers, Volume 21, pages 369–412 (Copyright 1970), the disclosure of which is incorporated herein. Vinyl chloride polymers having suitable relative viscosities for use in the practice of this invention are available commercially. For best results, the relative viscosity (as measured at a concentration of 1 gram per 100 grams of cyclohexanone at 25° C.) of the vinyl chloride resin should fall within the range of about 1.50 to about 1.65 and accordingly the use of such vinyl chloride resins is preferred. Polyvinyl chloride homopolymer resins falling within this relative viscosity range are particularly preferred.

Component (b), copolymers containing, as the principal parts, a vinyl aromatic compound and an $\alpha,\beta$-unsaturated cyclic anhydride, are also well known in the art and are described in the literature. Minor amounts of other monomer units, e.g., acrylonitrile, may be present in the copolymer to modify its production and performance characteristics. In general, the copolymers may be prepared by conventional bulk or solution techniques using free-radical initiation. For example, styrene-maleic anhydride copolymers can be obtained by simply reacting the two monomers, i.e., styrene and maleic anhydride, at 50° C., in the presence of benzoyl peroxide. The rate of polymerization may be better controlled if a solvent such as acetone, benzene, toluene or xylene is used.

Vinyl aromatic compounds of component (b) can be compounds of the formula:

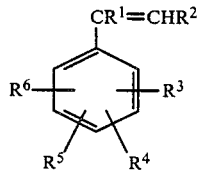

wherein $R^1$ and $R^2$ are independently selected from the group consisting of alkyl groups of from 1 to 6 carbon atoms and hydrogen; $R^3$, $R^4$, $R^5$ and $R^6$ may be concatenated together with hydrocarbyl groups to form a naphthyl group in which the vinylic substituent is preferably in the 1-position. All such compounds are free of any substituent that has a tertiary carbon atom. Preferred vinyl aromatics are the styrenes, i.e., compounds in which $R^2$ is hydrogen and $R^3$, $R^4$, $R^5$ and $R^6$ are independently hydrogen, alkyl of 1 to 6 carbon atoms, chlorine or bromine. Of these compounds, styrenes in which $R^1$ is hydrogen or methyl and $R^3$, $R^4$, $R^5$ and $R^6$ are independently hydrogen, methyl or ethyl are most preferred. Styrene itself is the most preferred vinyl aromatic compound.

The cyclic anhydride compounds of component (b) are preferably $\alpha,\beta$-unsaturated dicarboxylic anhydrides. For example, the term cyclic anhydride identifies anhydrides having the formula:

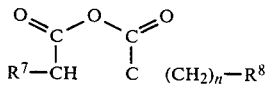

wherein the dash lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms and n is an integer of from 0 to about 10. Examples include maleic anhydride, methyl maleic anhydride, dimethyl maleic anhydride, citraconic anhydride, itaconic anhydride, phenylmaleic anhydride, aconitic anhydride, and mixtures thereof. Maleic anhydride is the preferred anhydride of component (b).

Copolymers of vinyl aromatic compounds and $\alpha,\beta$-unsaturated cyclic anhydrides which can be used in the practice of this invention are described in U.S. Pat. Nos. 2,769,804; 2,971,939 and 3,336,267, the disclosures of which are incorporated herein by reference.

As noted above, these copolymers can be and preferably are rubber-modified copolymers. In preparing these rubber-modified copolymers, use of such rubbers as polybutadiene, isobutylene-isoprene copolymers, styrene-butadiene copolymers, butadiene-acrylonitrile copolymers, ethylene-propylene copolymers, polyisoprene, ethylene-propylene-diene monomer terpolymers (EPDM) and the like can be employed. In this connection, see U.S. Pat. No. 3,919,354, the disclosure of which is incorporated herein by reference.

As mentioned previously, component (b) copolymers, whether rubber-modified or not, comprise from about 90 to about 70 parts by weight of the vinyl aromatic compound and from about 10 to about 30 parts by weight of the $\alpha,\beta$-unsaturated cyclic anhydride copolymerized therewith. These copolymers have a number average molecular weight of at least thirty thousand and the relative proportions, in the preferred type of copolymer, i.e., styrenemaleic anhydride copolymers, fall within the range of from about 86 to about 80 weight percent of the styrene monomer and from about 14 to about 20 weight percent of the anhydride monomer. Preferred rubber-modified copolymers used herein contain about 5 to 25 (most preferably 8 to 22) parts by weight of the rubber per 100 parts by weight of the styrene/anhydride copolymer, although lesser amounts, even down to trace amounts of rubber, are suitable.

In preferred blends of this invention, the ratio of the parts by weight of component (a) to the parts by weight of component (b) falls within the range of from about 30/70 to about 60/40. Most highly preferred are blends in which the ratio falls within the range of from about 40/60 to about 60/40.

Component (c) as before-mentioned is a styrene-maleic anhydride copolymer having a number average molecular weight within the range of from about 1000 to about 8000. The ratio of styrene to maleic anhydride constituents in the copolymer may range from 1:1 to 3:1. A highly preferred component (c) copolymer is one having a number average molecular weight within the range of from about 850 to about 3366 and a ratio of styrene to maleic anhydride constituent of 2:1. Exemplary of such a preferred copolymer is Arco Chemical Co.'s SMA 2000. Other commercially available component (c) copolymers available from ARCO Chemical Co. are SMA 1000 and SMA 3000 which have, respectively, a number average molecular weight of 1600 and 1900, and a styrene to maleic anhydride ratio of 1:1 and 3:1. As mentioned previously, the component (c) copolymer is present in the blend in an amount within the range of from about 0.5 to about 3 parts by weight per hundred parts by weight of components (a) and (b). Most preferably, the amount will be within the range of from about 1 to about 2 parts by weight per hundred parts by weight of component (a) and (b).

Component (d) is an alkyl diphenyl phosphite in which the alkyl group has from about 6 to about 18 carbon atoms. Either one or both of the phenyl groups may have alkyl substituent(s) containing up to about two carbon atoms each. Preferred component (d) phosphites are those in which the alkyl group contains from 6 to about 10 carbon atoms. Exemplary component (d) phosphites are:
octyl phenyl-2-methylphenyl phosphite;
octyl di[2-methylphenyl]phosphite;
heptyl phenyl-2,3-dimethylphenyl phosphite;
nonyl phenyl-2,4-dimethylphenyl phosphite;
nonyl di[2,4-dimethylphenyl]phosphite;
decyl phenyl-2,4,6-trimethylphenyl phosphite
octyl phenyl-2-methyl-4-ethylphenyl phosphite;
octyl di[2-methyl-4-ethylphenyl]phosphite;
hexyl phenyl-2-ethylphenylphosphite;
octyl phenyl-2,4,6-triethylphenyl phosphite;
octyl di[2,4,6-triethylphenyl]phosphite;

A most preferred component (d) phosphite is an octyl diphenyl phosphite. Such phosphites are available commercially, e.g., Borg Warner Chemicals' WESTON ODPP. Component (d) phosphites may be produced in accordance with art recognized methods. See, for example, Kirk Othmer, *Encyclopedia of Chemical Technology*, Second Edition, Interscience Publishers, Volume 15, pages 320-323, the disclosure of which is incorporated herein.

To improve their impact strength, the blends of this invention may contain various impact modifiers which are well recognized in the art. Exemplary of such impact modifiers are the impact modifier grades of: acrylonitrile and styrene grafted on polybutadiene or on styrene-butadiene copolymer rubber (ABS); styrene-methylmethacrylate grafted on polybutadiene or on styrene-butadiene copolymer rubber (MBS); and styrene-methyl methacrylate-acrylonitrile grafted on polybutadiene or on styrene-butadiene copolymer rubber (MABS); or mixtures thereof. The foregoing polymers are well known and are available commercially. For example, a suitable ABS polymer for use in the blends of this invention is Blendex 101 Resin marketed by Borg Warner Corporation. Borg Warner also markets a suitable MABS polymer under the designation of Blendex 436 Resin. A suitable MBS polymer is Rohm and Haas Company's KM 653. A preferred MBS polymer is sold by Kanegafuchi Chemical Company and is designated as B-56. When ABS, MBS, MABS or mixtures thereof are used as the impact modifier, they should be present in the blends of this invention in an amount, measured as parts by weight per one hundred parts of components (a) and (b), within the range of from about 3 to about 30 parts and preferably within the range of from about 7 to about 25 parts.

Another useful and commercially available impact modifier is chlorinated polyethylene resin. For example, various grades of this resin may be purchased from the Dow Chemical Company under the designations CPE 3614, CPE 3615 and CPE 3623A. Generally, the chlorinated polyethylene resin is present in the blend in an amount within the range of from about 3 to about 20 parts by weight per hundred parts by weight of components (a) and (b). Most preferably, the amount will be within the range of from about 6 to about 15 parts by weight per hundred parts by weight of component (a) and (b).

It has been found beneficial to use a combination of chlorinated polyethylene and ABS, MBS, MABS or mixtures thereof as the impact modifier system. When this combination is used, the blend will have a good Izod Impact and heat deflection temperature, as measured at 66 psi.

For protection against thermal degradation, polyvinyl chloride stabilizers can be added to the compositions of this invention. Examples of suitable stabilizers are metal salts and soaps such as the laurates or stearates of barium, cadmium or zinc; the laurates and stearates of lead (e.g., monobasic and dibasic lead stearates), basic lead carbonate, basic lead sulfates, dibasic lead phosphite, dibasic lead phthalate, basic lead silicate, white lead, lead chlorosilicate, lead oxide, lead oxide-lead silicate mixtures and the like. It has been found beneficial, when using lead stabilizers, to add a melt viscosity suppressant to the blend. Exemplary of such a useful suppressant is Vynathene 902 which is marketed by U.S. Industrial Chemicals. The amount of suppressant used will be dependent upon the processing requirements of the user. Generally speaking, amounts of suppressant within the range of from about 2 to about 8 parts by weight per hundred parts by weight of components (a) and (b) will be useful.

A preferred embodiment of this invention uses tin stabilizers in the blends as such materials have been found particularly effective as polyvinyl chloride stabilizers. Exemplary of such tin stabilizers are di-n-alkyltin mercaptides, di-n-alkyltin dilaurates, dibutyltin dimaleate, dibutyltin lauryl mercaptide, di-n-octyltin-S,S'-bis-(isooctyl mercaptoacetate), dibutyltin-S,S'-bis(isooctyl mercaptoacetate), di-n-octyl tin maleate polymer, dibutyltin mercaptopropionate and the like. A highly preferred tin stabilizer is Argus Chemical Co., Inc.'s MARK 1900.

The amount of stabilizer used can be varied. Normally the amount will range from about 1 to about 4 phr—i.e., about 1 to about 4 parts by weight per one hundred parts by weight of components (a) and (b).

Processing aids of various types are entirely suitable for use in the blends of this invention. For example, use may be made of such polyvinyl chloride processing aids as those made from copolymers of methyl methacrylate and styrene, terpolymers of methyl methacrylate, lower alkyl acrylate and acrylonitrile, or terpolymers of methyl methacrylate, lower alkyl acrylate and dialkyl itaconate, and the like. The preferred processing aids are methyl methacrylate-lower alkyl acrylate copolymers having a small portion (e.g., 3 to 15 percent) of the lower alkyl acrylate comonomer and having an inherent viscosity, as measured at a concentration of 0.25 grams per 100 milliliters of chloroform at 25° C., of at least 0.1 and preferable 0.5 or higher. A variety of such processing aids, including the preferred types, are available from various commercial sources. The amount of processing aid will generally range from about 0.5 to about 10 parts by weight per hundred parts by weight of components (a) and (b).

Typical lubricants which may be used in the blends of this invention include metal soaps, stearic acid, glyceryl monostearate, ethyl diaminostearate, mineral oil, paraffin and low molecular weight waxes, and the like. Conventional pigments used in polyvinyl chloride may likewise be used in the blends of this invention in conventional amounts. Ordinarily the concentration of lubricant and pigment will not exceed about 10 parts by weight per one hundred parts by weight of components (a) and (b).

If desired, small amounts of reinforcing fibers such as carbon filaments, asbestos, titanate whiskers, and glass fiber may be employed. The amount of such materials are added in amounts to achieve the desired performance properties. Ordinarily such reinforcing fiber would be used in lieu of a filler although small proportions of both materials may prove satisfactory.

Flame retarding additives which may be used in the compositions of the invention comprise a large number of chemical compounds which are well known to those skilled in the art. In general, they contain chemical elements which are used because of their flame-retarding capacity, for example, bromine, chlorine, antimony, phosphorus and nitrogen. Preferably, the use of flame-retarding additives comprises using a combination of flame retarding organic and inorganic compounds. Exemplary of suitable organic compounds are decabromodiphenyl oxide, octobromodiphenyl oxide, brominated polystyrene, etc. Suitable inorganic compounds are materials such as antimony compounds (e.g., antimony trioxide), zinc compounds (e.g., zinc borate), antimony-zinc complex compounds (e.g., Oncor 75RA, a product of NL Industries, Inc.), iron compounds (e.g., ferric oxide), and other metal based inorganic compounds which perform well with antimony oxide (e.g., Ongard 2, a product of NL Industries, Inc.). When using a flame retardant, the amount should be sufficient to yield a blend having a UL 94 rating of V-2 or better using test bars 0.060 inch thick.

Smoke suppressing additives may also be used. Examples include alumina trihydrate, cuprous cyanide, and combinations of nickel carbonate and zinc oxide. Very small amounts of organic phosphites and phenolic compounds are suitable as antioxidants.

The compositions of the invention may be prepared by blending the components in a mixer (e.g., a Henschel mixer) and compounding the mixture on an extruder (e.g., a Buss Ko-Kneader, a Farrel Continuous Mixer, a Banbury Mixer or a Killion compounding extruder). Thereafter, the extrudate is chopped into pellets and molded on an injection molding machine. The injection mold should have smooth, clean interior surfaces so that the gloss of articles injection molded from the blends of this invention will not be adversely affected by mold surface deficiencies.

The present invention is further illustrated in the following example, which is not to be construed as limiting.

In the Example, a blend of this invention was prepared by the above-mentioned blending and compounding. The resultant pellets were injection molded on a New Britain injection molding machine at the following conditions:

| | |
|---|---|
| Zone 1 | 310° F. |
| Zone 2 | 320° F. |
| Zone 3 | 330° F. |
| Nozzle | 70% |
| Injection Speed | 6.5 turns off maximum |
| Shot Size | 1.25-1.3 |
| Hold Time | 5 seconds |
| Cooling Time | 35 seconds |
| Mold Temperature, °F. | 100/100 |
| Injection Pressure | Maximum |
| Hold Pressure | 1300 psi |
| Back Pressure | 400 psi |

The individual components used in making up the blend in the following Example are identified by their product designation. The following table identifies each component used.

| Component | Product Designation | Marketed and/or Manufactured by |
|---|---|---|
| polyvinyl chloride resin | SM-160 | Ethyl Corporation |
| styrene-maleic anhydride copolymer | DKB-218 | Arco Chemical Co., Inc. |
| organotin stabilizer | Mark-OTM-2 | Argus Chemical Co., Inc. |
| calcium stearate | Calcium Stearate (RSN11-4) | Mallinckrodt Chemical Works |
| mineral oil | Kaydol | Witco Chemical Corporation |
| acrylic polymer | Acryloid K-125 | Rohm and Haas Company |
| octyl diphenyl phosphite | Weston ODPP | Borg Warner Chemicals |
| styrene-maleic anyhdride copolymer of 2/1 styrene/maleic-anhydride ratio | SMA 2000 | Arco Chemical Co. Inc. |
| decabromodiphenyl oxide | Saytex 102 | Saytech, Inc. |
| antimony trioxide | Ultrafine II | PPG Industries |
| chlorinated polyethylene | CPE-3615 | The Dow Chemical Company |
| MBS | Acryloid KM 653 | Rohm and Haas Company |
| fatty acid ester | Vinylube 38 | Glyco, Inc. |
| treated calcium carbonate | Winnofil-S | ICI United States, Inc. |

EXAMPLE

A blend of this invention was prepared using the following components:

| Components | Parts by Weight |
|---|---|
| SM-160 | 50 |
| DKB-218 | 50 |
| Mark OTM-2 | 2 |
| Calcium Stearate | 2 |
| Kaydol | 2 |
| Acryloid K-125 | 2 |
| Vinylube 38 | .5 |
| Weston ODPP | as listed |
| SMA 2000 | as listed |
| Winnofil-S | 3 |
| CPE-3615 | 10 |
| Acryloid KM-653 | 12 |

The blend was injection molded to yield test articles which had the gloss values shown in the following Table.

TABLE

| Sample | 1 | 2 | 3 | 4 |
|---|---|---|---|---|
| Weston ODPP | 2 | 0 | 1 | 0 |
| SMA 2000 | 0 | 2 | 1 | 0 |
| Gloss values, ASTM D523-80 | 54 | 87 | 89 | 67 |

The blend used in this example will be found to have physical properties comparable to the blends disclosed in U.S. Pat. application Ser. No. 209,843 mentioned previously.

As can be seen from the above gloss values that the combination of a component (c) and a component (d) blend constituent gives an injection molded article a gloss higher than that realized by using these components individually or not at all.

We claim:

1. A thermoplastic molding composition which comprises in intimate admixture:
   (a) a vinyl chloride polymer having a relative viscosity, as measured at a concentration of 1 gram per 100 grams of cyclohexanone at 25° C., falling within the range of from about 1.50 to about 1.85;
   (b) a copolymer of a vinyl aromatic compound and an α,β-unsaturated cyclic anhydride having a number average molecular weight of at least 30,000 and in which the content of said vinyl aromatic compound is within the range of from about 90 to about 70 weight percent and the content of said anhydride is within the range of from about 10 to about 30 weight percent;
   (c) a styrene-maleic anhydride copolymer having a number average molecular weight within the range of from about 1000 to about 8000; and
   (d) an alkyl diphenyl phosphite in which the alkyl group has from about 6 to about 18 carbon atoms.

2. A composition of claim 1 wherein (b) is a copolymer of a styrene and maleic anhydride.

3. A composition of claim 1 wherein (b) is a copolymer of styrene and maleic anhydride in which the relative proportions fall within the range of from about 86 to 80 weight percent of styrene and within the range of from about 14 to about 20 weight percent of maleic anhydride.

4. A composition of claim 1 wherein (a) is polyvinyl chloride.

5. A composition of claim 1 wherein (a) is polyvinyl chloride having a relative viscosity as measured at a concentration of 1 gram per 100 grams of cyclohexanone at 25° C. falling within the range of from about 1.50 to about 1.65.

6. A composition of claim 1 wherein (a) is polyvinyl chloride and (b) is a copolymer of a styrene and maleic anhydride.

7. A composition of claim 1 wherein (a) is polyvinyl chloride having a relative viscosity, as measured at a concentration of 1 gram per 100 grams of cyclohexanone at 25° C., falling within the range of from about 1.50 to about 1.65, and (b) is a copolymer of styrene and maleic anhydride in which the relative proportions fall within the range of from about 86 to about 80 weight percent of styrene and the range of from about 14 to about 20 weight percent of maleic anhydride.

8. A composition of claim 1 wherein said composition additionally includes a tin containing thermal stabilizer for polyvinyl chloride.

9. A composition of claim 7 wherein said composition additionally contains either di-n-octyltin-S,S'-bis(isooctyl mercaptoacetate) or dibutyltin-S,S'-bis(isooctyl mercaptoacetate).

10. A composition of claim 1 wherein the ratio of styrene to maleic anhydride in component (c) is within the range of 1:1 to 3:1.

11. A composition of claim 10 wherein said ratio is 2:1.

12. A composition of claim 1 wherein either one or both of the phenyl groups in (d) have alkyl substituents containing up to two carbon atoms.

13. A composition of claim 1 wherein (d) is an octyl diphenyl phosphite.

14. A composition of claim 11 wherein (d) is an octyl diphenyl phosphite.

15. A composition of claim 1 wherein said composition contains, measured as parts by weight per hundred parts by weight of (a) and (b), within the range of from about 80 to about 20 parts (a) and within the range of from about 20 to about 80 parts (b).

16. A composition of claim 1 wherein (c) is present in an amount within the range of from about 0.5 to about 3 parts by weight per hundred parts by weight of (a) and (b) and wherein (d) is present in an amount within the range of from about 0.5 to about 3 parts by weight per hundred parts by weight of (a) and (b).

17. A composition of claim 16 wherein (c) has a ratio of styrene to maleic anhydride of 2:1 and (d) is octyl diphenyl phosphite.

18. A composition of claim 17 wherein said composition contains, measured as parts by weight per hundred parts by weight of (a) and (b), within the range of from about 80 to about 20 parts (a) and within the range of from about 20 to about 80 parts (b).

19. A composition of claim 18 wherein (a) is polyvinyl chloride and (b) is a copolymer of a styrene and maleic anhydride.

20. A composition of claim 18 wherein (a) is polyvinyl chloride having a relative viscosity, as measured at a concentration of 1 gram per 100 grams of cyclohexanone at 25° C., falling within the range of from about 1.50 to about 1.65, and (b) is a copolymer of styrene and maleic anhydride in which the relative proportions fall within the range of from about 86 to about 80 weight percent of styrene and the range of from about 14 to about 20 weight percent of maleic anhydride.

21. A composition of claim 19 wherein said admixture additionally includes a tin containing thermal stabilizer for polyvinyl chloride, which stabilizer is present in an amount within the range of from about 1 to about 4 parts by weight per hundred parts by weight of (a) and (b).

22. A composition of claim 20 wherein said tin containing thermal stabilizer is either di-n-octyltin-S,S'-bis-(isooctyl mercaptoacetate) or dibutyltin-S,S'-bis-(isoocytl mercaptoacetate).

23. The composition of claim 18 wherein said composition additionally contains flame retarding amounts of a flame retarding organic compound and a flame retarding inorganic compound.

24. The composition of claim 22 wherein said flame retarding organic compound is decabromodiphenyl oxide and said flame retarding inorganic compound is antimony trioxide.

25. A thermoplastic molding composition which comprises in intimate admixture:
   (a) a vinyl chloride polymer having a relative viscosity, as measured at a concentration of 1 gram per 100 grams of cyclohexanone at 25° C., falling within the range of from about 1.50 to about 1.85;
   (b) a rubber-modified graft copolymer of a vinyl aromatic compound and an α,β-unsaturated cyclic anhydride in which said rubber-modified graft copolymer contains up to 33 parts by weight of the rubber per 100 parts by weight of the copolymer and in which the copolymer has a number average molecular weight of at least 30,000 and has said vinyl aromatic compound present in an amount within the range of from about 90 to about 70 weight percent and said anhydride present in an amount within the range of from about 10 to about 30 weight percent;
   (c) a styrene-maleic anhydride copolymer having a number average molecular weight within the range of from about 1000 to about 8000; and (d) an alkyl diphenyl phospite in which the alkyl group has from about 6 to about 18 carbon atoms.

26. A composition of claim 25 wherein the copolymer moiety in (b) is a copolymer of a styrene and maleic anhydride.

27. A composition of claim 25 wherein the copolymer moiety in (b) is a copolymer of styrene and maleic anhydride in which the relative proportions fall within the range of from about 86 to 80 weight percent of styrene and within the range of from about 14 to about 20 weight percent of maleic anhydride.

28. A composition of claim 25 wherein (a) is polyvinyl chloride.

29. A composition of claim 25 wherein (a) is polyvinyl chloride having a relative viscosity, as measured at a concentration of 1 gram per 100 grams of cyclohexanone at 25° C., falling within the range of from about 1.50 to about 1.65.

30. A composition of claim 25 wherein (a) is polyvinyl chloride and (b) is a copolymer of a styrene and maleic anhydride.

31. A composition of claim 25 wherein (a) is polyvinyl chloride having a relative viscosity, as measured at a concentration of 1 gram per 100 grams of cyclohexanone at 25° C., falling within the range of from about 1.50 to about 1.65, and the copolymer moiety in (b) is a copolymer of styrene and maleic anhydride in which the relative proportions fall within the range of from about 86 to about 80 weight percent of styrene and the range of from about 14 to about 20 weight percent of maleic anhydride.

32. A composition of claim 25 wherein said composition additionally includes a tin containing thermal stabilizer for polyvinyl chloride.

33. A composition of claim 25 wherein said composition additionally contains either di-n-octyltin-S,S'-bis(isooctyl mercaptoacetate) or dibutyltin-S,S'-bis(isooctyl mercaptoacetate).

34. A composition of claim 25 wherein the ratio of styrene to maleic anhydride in component (c) is within the range of 1:1 to 3:1.

35. A composition of claim 34 wherein said ratio is 2:1.

36. A composition of claim 25 wherein either one or both of the phenyl groups in (d) have alkyl substituents containing up to two carbon atoms.

37. A composition of claim 25 wherein (d) is an octyl diphenyl phosphite.

38. A composition of claim 35 wherein (d) is an octyl diphenyl phosphite.

39. A composition of claim 25 wherein said composition contains, measured as parts by weight per hundred parts by weight of (a) and (b), within the range of from about 80 to about 20 parts (a) and within the range of from about 20 to about 80 parts (b).

40. A composition of claim 25 wherein said (c) is present in an amount within the range of from about 0.5 to about 3 parts by weight per hundred parts by weight of (a) and (b) and wherein (d) is present in an amount within the range of from about 0.5 to about 3 parts by weight per hundred parts by weight of (a) and (b).

41. A composition of claim 40 wherein (c) has a ratio of styrene to maleic anhydride of 2:1 and (d) is octyl diphenyl phosphite.

42. A composition of claim 41 wherein said composition contains, measured as parts by weight per hundred parts by weight of (a) and (b), within the range of from about 80 to about 20 parts (a) and within the range of from about 20 to about 80 parts (b).

43. A composition of claim 42 wherein (a) is polyvinyl chloride and the copolymer moiety in (b) is a copolymer of a styrene and maleic anhydride.

44. A composition of claim 42 wherein (a) is polyvinyl chloride having a relative viscosity, as measured at a concentration of 1 gram per 100 grams of cyclohexanone at 25° C., falling within the range of from about 1.50 to about 1.65, and the copolymer moiety in (b) is a copolymer of styrene and maleic anhydride in which the relative proportions fall within the range of from about 86 to about 80 weight percent of styrene and the range of from about 14 to about 20 weight percent of maleic anhydride.

45. A composition of claim 43 wherein said admixture additionally includes a tin containing thermal stabilizer for polyvinyl chloride, which stabilizer is present in an amount within the range of from about 1 to about 4 parts by weight per hundred parts by weight of (a) and (b).

46. A composition of claim 44 wherein said tin containing thermal stabilizer is either di-n-octyltin-S,S'-bis(isooctyl mercaptoacetate) or dibutyltin-S,S'-bis(isooctyl mercaptoacetate).

47. The composition of claim 42 wherein said composition additionally contains flame retarding amounts of a flame retarding organic compound and a flame retarding inorganic compound.

48. A composition of claim 46 wherein said flame retarding organic compound is decabromodiphenyl oxide and said flame retarding inorganic compound is antimony trioxide.

* * * * *

UNITED STATES PATENT AND TRADEMARK OFFICE
CERTIFICATE OF CORRECTION

PATENT NO. : 4,506,049

DATED : March 19, 1985

INVENTOR(S) : Warren B. Mueller et al

It is certified that error appears in the above-identified patent and that said Letters Patent is hereby corrected as shown below:

Column 3, line 64, reads "$R^7-CH\ C_8(CH_2)_n-R^8$" and should read -- $R^7-\!-\!CH-\!-\!C-\!-\!(CH_2)_n-R^8$ --.

Signed and Sealed this

Third Day of September 1985

[SEAL]

Attest:

DONALD J. QUIGG

Attesting Officer  Acting Commissioner of Patents and Trademarks - Designate